United States Patent
Cooper

(10) Patent No.: US 7,089,430 B2
(45) Date of Patent: Aug. 8, 2006

(54) MANAGING MULTIPLE PROCESSOR PERFORMANCE STATES

(75) Inventor: Barnes Cooper, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 593 days.

(21) Appl. No.: 10/027,652

(22) Filed: Dec. 21, 2001

(65) Prior Publication Data

US 2003/0120961 A1  Jun. 26, 2003

(51) Int. Cl.
 G06F 1/26 (2006.01)
 G06F 1/32 (2006.01)

(52) U.S. Cl. .................. 713/300; 713/320; 713/322

(58) Field of Classification Search ............... 713/320, 713/322, 323, 500, 300; 702/132; 395/184.01
 See application file for complete search history.

(56) References Cited

U.S. PATENT DOCUMENTS

| | | | |
|---|---|---|---|
| 5,021,679 A | 6/1991 | Fairbanks et al. | |
| 5,153,535 A | 10/1992 | Fairbanks et al. | |
| 5,307,003 A | 4/1994 | Fairbanks et al. | |
| 5,627,412 A | 5/1997 | Beard | |
| 5,752,011 A | 5/1998 | Thomas et al. | |
| 5,796,939 A * | 8/1998 | Berc et al. | 714/47 |
| 5,958,058 A * | 9/1999 | Barrus | 713/320 |
| 5,974,557 A | 10/1999 | Thomas et al. | |
| 6,082,623 A * | 7/2000 | Chang | 236/49.3 |
| 6,112,164 A * | 8/2000 | Hobson | 702/132 |
| 6,216,235 B1 | 4/2001 | Thomas et al. | |
| 6,487,668 B1 | 11/2002 | Thomas et al. | |
| 6,721,892 B1 * | 4/2004 | Osborn et al. | 713/300 |
| 2001/0003206 A1 * | 6/2001 | Pole et al. | 713/320 |

OTHER PUBLICATIONS

Advanced Configuration and Power Interface Specification Rev. 2.0, Jul. 27, 2000 Compaq Computer Corp, Intel Corp, Microsoft Corp, Phoenix Tech. Ltd., Toshiba Corp.

* cited by examiner

Primary Examiner—Lynne H. Browne
Assistant Examiner—Stefan Stoynov
(74) Attorney, Agent, or Firm—Cindy T. Faatz

(57) ABSTRACT

In one embodiment of the invention, a performance information associated with a processor is read. A processor performance table that corresponds to the performance information is located. The performance table includes a plurality of performance parameters to control performance of the processor. A performance state (PS) structure is updated using one of the processor performance table and a default table.

27 Claims, 8 Drawing Sheets

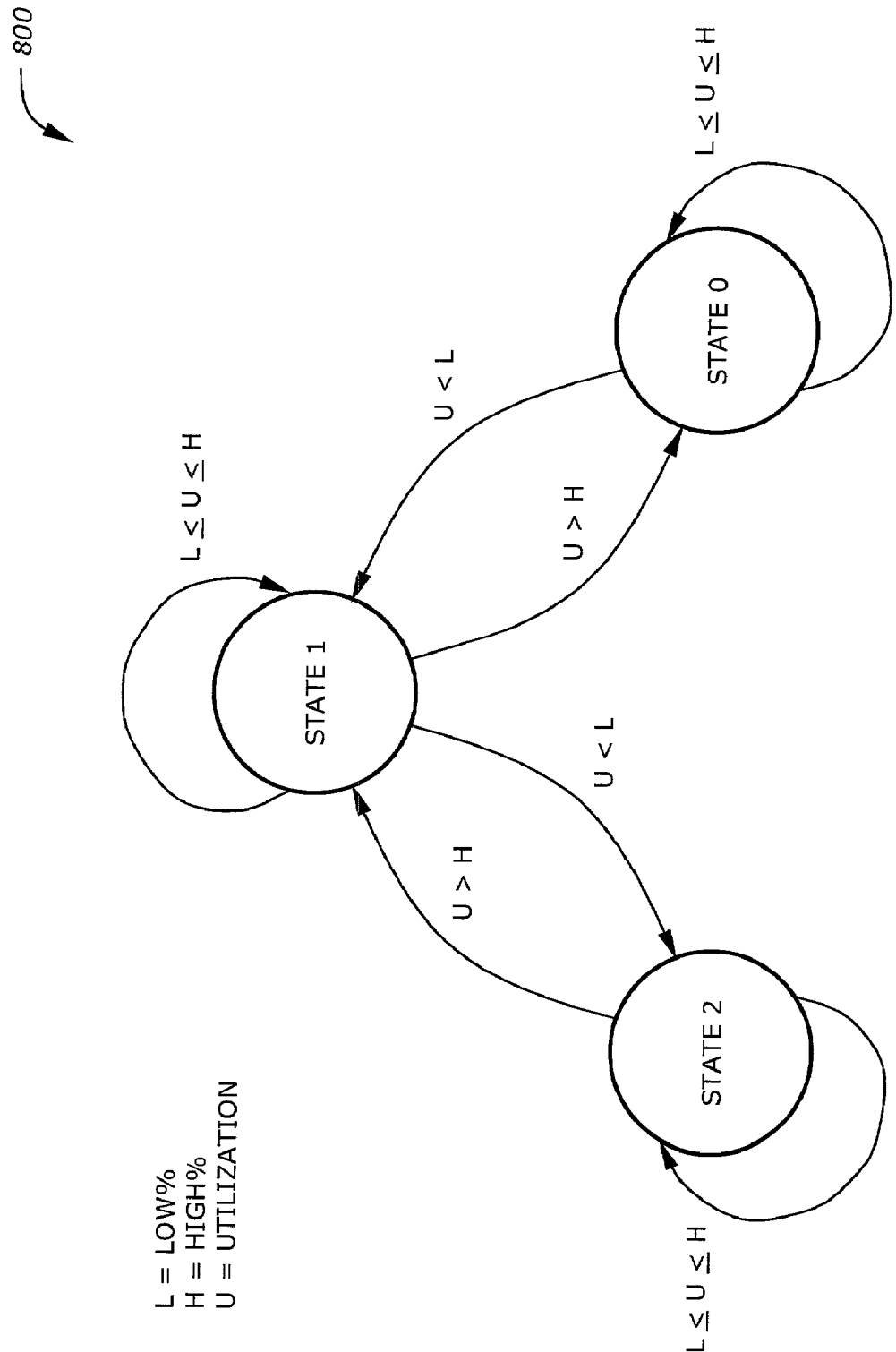

MANAGING MULTIPLE PROCESSOR PERFORMANCE STATES

BACKGROUND

1. Field of the Invention

This invention relates to microprocessors. In particular, the invention relates to processor performance states.

2. Description of Related Art

Advances in microprocessor technology have provided users with high level of performance flexibility. For example, mobile processors offer users two performance modes: Maximum Performance mode and Battery Optimized mode. Maximum Performance mode takes advantage of the additional power provided by an alternating current (AC) power source to provide a new level of mobile personal computer (PC) performance, while Battery Optimized mode provides optimal performance while running on battery. In Maximum Performance mode, the processor delivers highest performance at the expense of high power consumption. In Battery Optimized mode, the processor provides lower performance but consumes much less power.

Recently, demands for high performance have accelerated development of very fast processors at more than 1 GHz operating frequency. This development has widened the separation between the Maximum Performance and Battery Optimized modes. Because the relationship between power versus frequency follows approximately a cubic relationship, it is possible to operate more efficiently by offering intermediary performance states, providing the ability to perform seamless transitions. It is therefore desirable to have multiple performance states between the two modes.

Therefore, there is a need to have a technique to manage multiple performance states.

BRIEF DESCRIPTION OF THE DRAWINGS

The features and advantages of the present invention will become apparent from the following detailed description of the present invention in which:

FIG. 8 is a state diagram illustrating a utilization switching policy according to one embodiment of the invention.

DESCRIPTION OF THE INVENTION

Figure 1:
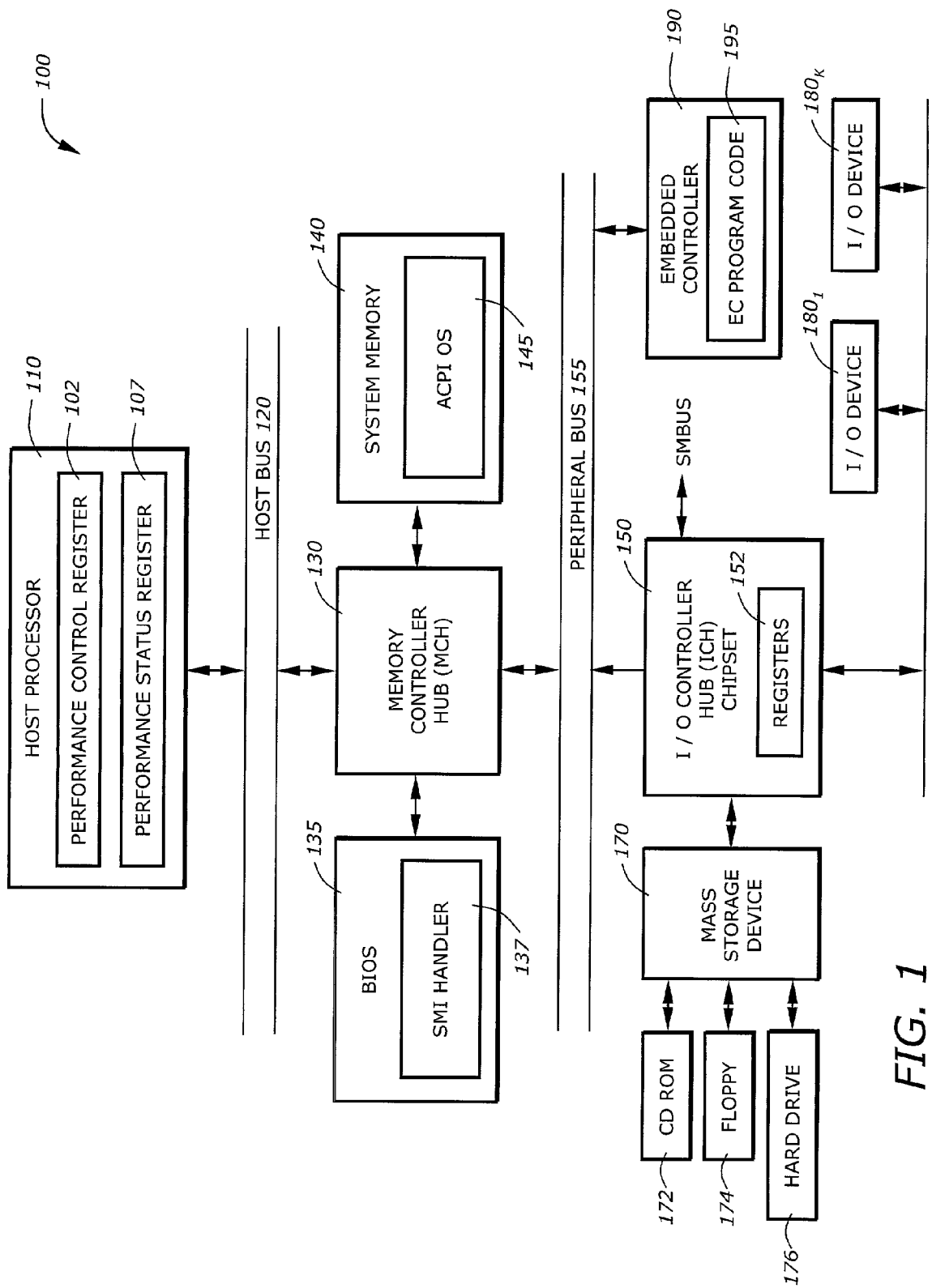
FIG. 1 is a diagram illustrating a system in which one embodiment of the invention can be practiced.

The present invention is a technique to manage multiple performance states for a processor. The controls of the processor are based on a model-specific register definition that allows for seamless native operating system (OS) control through a processor driver, or abstracted through a system management interrupt (SMI) interface. In one embodiment of the invention, a SMI driver reads performance information associated with the processor. The SMI driver locates a processor performance table that corresponds to the performance information. The performance table includes a plurality of performance parameters to control performance of the processor. A performance state structure is updated using one of the processor performance table and a default table. The PS structure is therefore updated dynamically and is visible to an Advanced Configuration and Performance Interface (ACPI) OS. Through the PS structure, the ACPI OS transitions to a next performance state when desired. The ACPI OS reads current performance information from a status register in the processor and compares the current performance information with the PS structure to locate a current entry in the PS structure. Then, the ACPI OS obtains a next entry based on the current entry. This next entry containing the control word for the desired performance state. The ACPI OS writes the next entry to a control register causing the processor to transitions to the next performance state.

In the following description, for purposes of explanation, numerous details are set forth in order to provide a thorough understanding of the present invention. However, it will be apparent to one skilled in the art that these specific details are not required in order to practice the present invention. In other instances, well-known structures are shown in block diagram form in order not to obscure the present invention.

The present invention may be implemented by hardware, software, firmware, microcode, or any combination thereof. When implemented in software, firmware, or microcode, the elements of the present invention are the program code or code segments to perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. The program or code segments may be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk (CD-ROM), an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

It is noted that the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

FIG. 1 is a diagram illustrating a system 100 in which one embodiment of the invention can be practiced. The system 100 includes a host processor 110, a host bus 120, a memory control hub (MCH) 130, a basic input and output system (BIOS) 135, a system memory 140, an input/output control hub (ICH) 150, a peripheral bus 155, a mass storage device 170, and input/output devices $180_1$ to $180_K$. Note that the system 100 may include more or less elements than these elements.

The host processor 110 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture. In particular, the processor 110 includes a performance control (PERF_CTL) register 102 and a performance status (PERF_STS) register 107. The PERF_CTL register 102 allows an OS to control the processor performance by changing the bus ratio and operating voltage. The bus ratio is related to the operating frequency and the voltage is related to the power consumption and also depends on the workload. The PERF_STS register 107 stores the current bus ratio and the current voltage identifier which is used to control a voltage regulator to generate appropriate operating voltage.

The host bus 120 provides interface signals to allow the processor 110 to communicate with other processors or devices, e.g., the MCH 130. The host bus 120 may support a uni-processor or multiprocessor configuration. The host bus 120 may be parallel, sequential, pipelined, asynchronous, synchronous, or any combination thereof.

The MCH 130 provides control and configuration of memory and input/output devices such as the BIOS 135, system memory 140, and the ICH 150. The MCH 130 may be integrated into a chipset that integrates multiple functionalities such as the isolated execution mode, host-to-peripheral bus interface, memory control. The MCH 130 interfaces to the peripheral bus 155. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The BIOS 135 stores boot-up or initialization code and data including look-up tables. The BIOS 135 is typically implemented with non-volatile memories such as flash memory, read only memory (ROM), erasable ROM, etc. The BIOS 135 or part of it may also be located internally to the MCH 130 or ICH 150. The BIOS 135 includes an SMI handler 137. The SMI handler 137 is a routine or subprogram to be invoked in response to an SMI. The details of the SMI handler will be explained later.

The system memory 140 stores system code and data. The system memory 140 is typically implemented with dynamic random access memory (DRAM) or static random access memory (SRAM). The system memory may include program code or code segments implementing one embodiment of the invention. The system memory includes a advanced configuration and power interface (ACPI) operating system (OS) 145 which may include separate elements. Any one of the elements of the system and power management module 145 may be implemented by hardware, software, firmware, microcode, or any combination thereof. The system memory 140 may also include other programs or data which are not shown, such as an operating system.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface to interface to the peripheral bus 155, processor interface, interrupt controller, direct memory access (DMA) controller, power management logic, timer, system management bus (SMBus), universal serial bus (USB) interface, mass storage interface, low pin count (LPC) interface, etc. In one embodiment, the ICH 150 has support for ACPI operations including system management interrupt (SMI), and system control interrupt (SCI).

The mass storage device 170 stores archive information such as code, programs, files, data, applications, and operating systems. The mass storage device 170 may include compact disk (CD) ROM 172, floppy diskettes 174, and hard drive 176, and any other magnetic or optic storage devices. The mass storage device 170 provides a mechanism to read machine-readable media. The machine-readable media may contain computer readable program code to perform tasks as described in the following. These tasks may include reading a performance information associated with the processor, locating a processor performance table that corresponds to the performance information, updating a performance state (PS) structure using one of the processor performance table and a default table, etc.

The I/O devices $180_1$ to $180_K$ may include any I/O devices to perform I/O functions. Examples of I/O devices $180_1$ to $180_K$ include controller for input devices (e.g., keyboard, mouse, trackball, pointing device), media card (e.g., audio, video, graphics), and any other peripheral controllers.

The embedded controller (EC) 190 is any controller such as micro-controller, digital signal processor, or any programmable device that can execute its own programs. The embedded controller 190 contains EC program code 195. The EC program code contains instructions that cause the EC 190 to perform specified operations.

Figure 2:
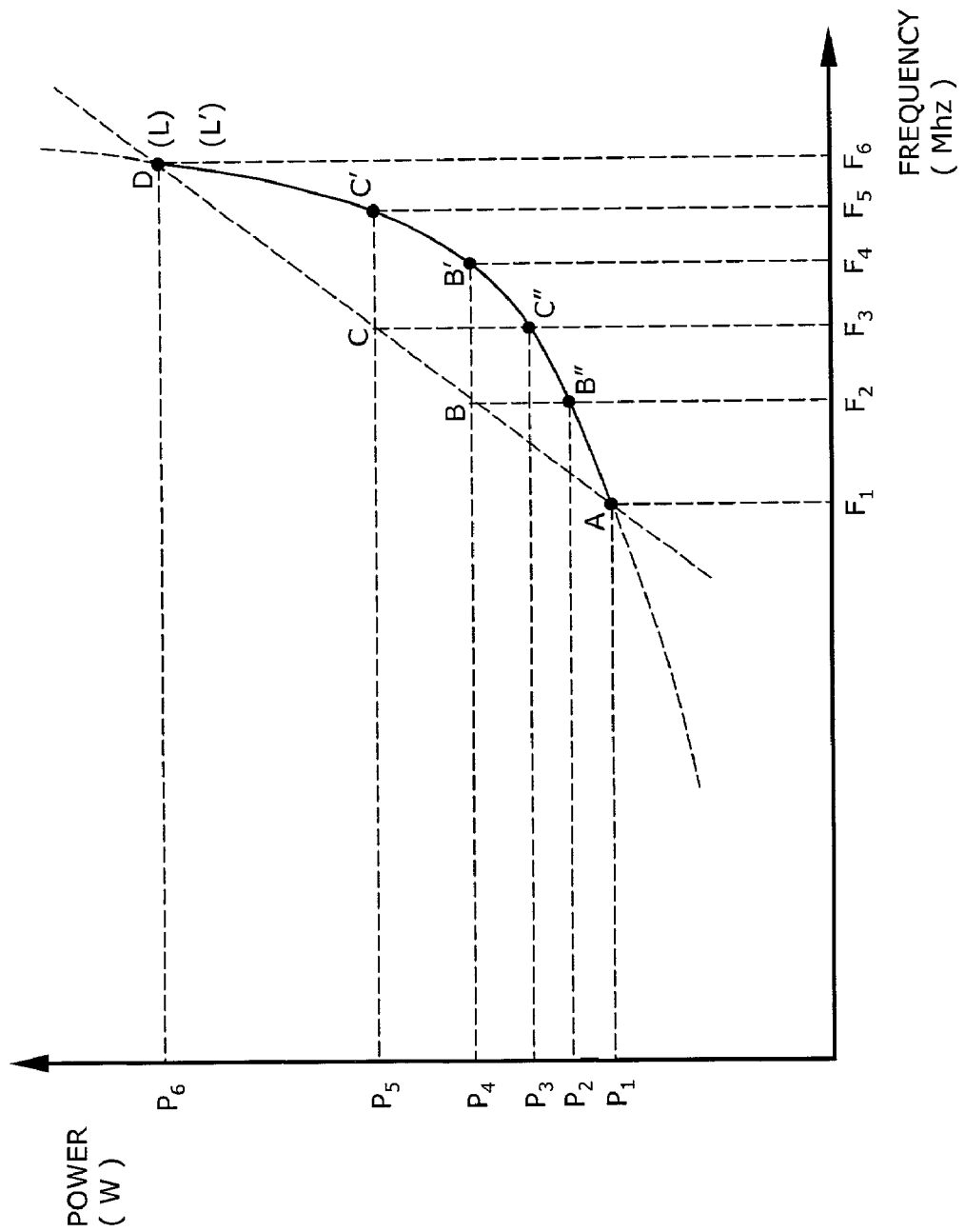
FIG. 2 is a diagram illustrating performance curves according to one embodiment of the invention.

FIG. 2 is a diagram illustrating performance curves according to one embodiment of the invention. There are two performance curves: Curve L and curve L' showing relationship between power (expressed in Watts) and frequency (expressed in MHz).

Curves L and L' intersect at two end points: A and D. The two end points A define the operating regions for power and frequency. Point A corresponds to the lowest performance having the lowest frequency F1 and the best power consumption having the lowest power P1. Point D corresponds to the highest performance having the highest frequency F6 and the worst power consumption having the highest power P6. Typically operating points A and D limit or define the safe or guaranteed performance region.

Curves L and L' represent linear and non-linear relationships between power and frequency. When the separation or gap between the highest and the lowest powers or frequencies is small, the linear approximation represented by curve L may be valid. However, when this separation becomes large, the linear relationship no longer holds. Instead, a non-linear (e.g., cubic or quadratic) relationship represented by curve L' is more accurate. Furthermore, when the separation is large, it is desirable to have multiple operating points instead of only two operating points at the two ends.

Configuring a processor to operate at multiple points on curve L' instead of curve L provides better use of processor. For the same performance, a lower power consumption may be achieved. Similarly, for the same power consumption, a higher performance can be achieved. Take, for example, operating point B on curve L corresponds to frequency F2 and power P4. Suppose the projections of B onto curve L' with respect to the frequency and power axes respectively give B'(F4, P4) and B"(F2, P2). It is noted that for the same power P4, B' has a higher performance (F4>F2). Similarly, for the same operating frequency at F2, B" provides a lower power consumption (P2<P4). Therefore, multiple operating points, or performance states, along the non-linear curve L' provide more efficient use of the processor.

Accordingly, it is desirable to be able to manage multiple processor performance states such that optimal utilization of power and delivery of performance can be achieved. Furthermore, this management should not require significant modification of the platform and conforms to industry standards. One recent standard regarding uses of multiple performance states is the Advanced Configuration and Power Interface (ACPI) standard, published by Compaq Computer Corporation, Intel Corporation, Microsoft Corporation, Phoenix Technologies Ltd, and Toshiba Corporation, Revision 2.0, in Jul. 27, 2000.

Figure 3:
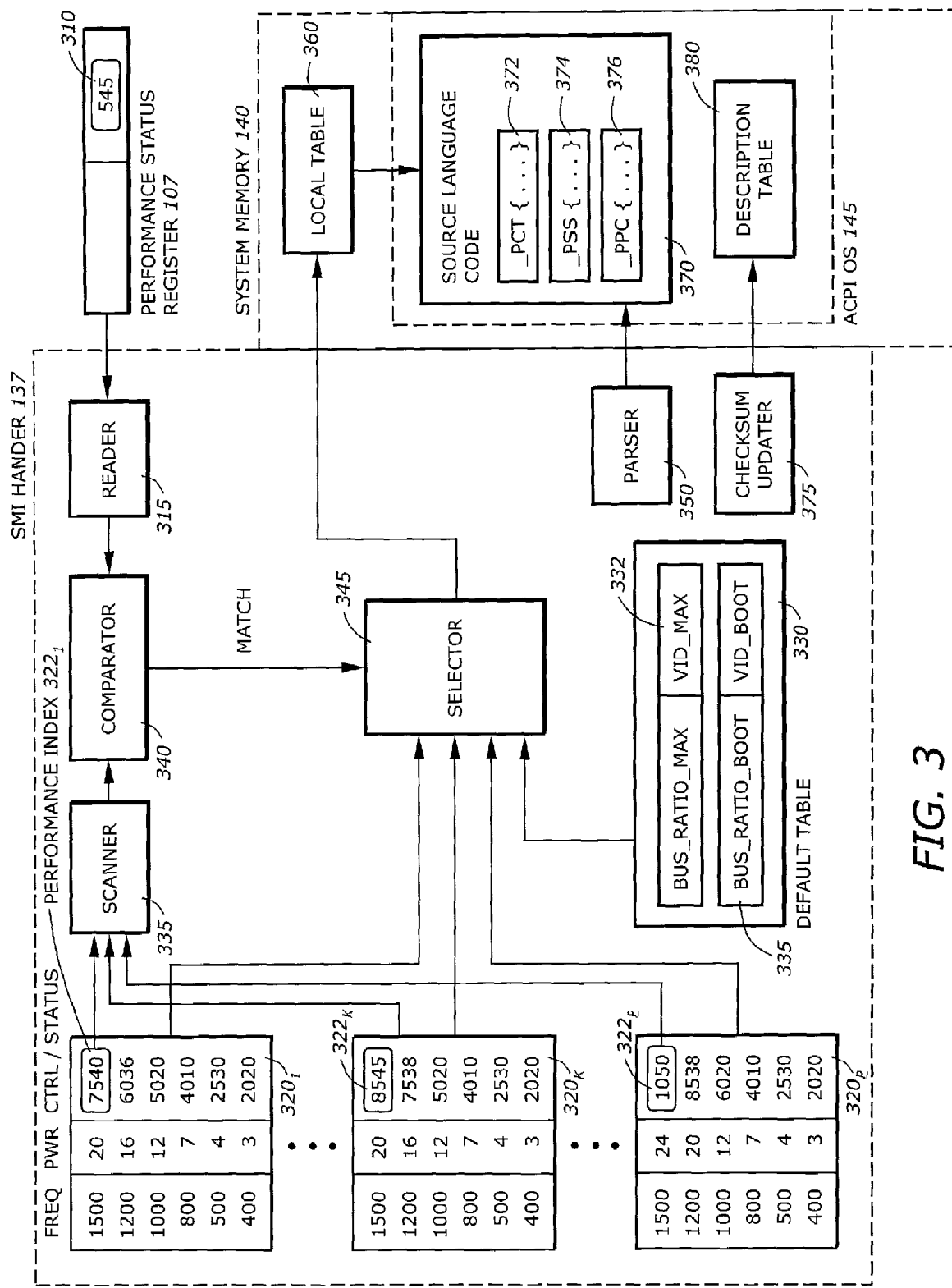
FIG. 3 is a diagram illustrating operations of the SMI handler according to one embodiment of the invention.

FIG. 3 is a diagram illustrating operations of the SMI handler 137 according to one embodiment of the invention. The SMI handler 137 interfaces with the system memory 140 and the processor 110. Note that the SMI handler 137 is a firmware component in the BIOS 135. Elements of the SMI handler 137 may be implemented in software, firmware, or hardware, or any combination thereof. In the following, some of by these elements are shown in block form which may refer to a firmware module, a software function, or a hardware circuit.

The SMI handler 137 performs a number of tasks. These tasks include: (1) reading a performance information associated with the processor 110, (2) locating a processor performance table that corresponds to the performance information, and (3) updating a performance state (PS) structure using one of the processor performance table and a default table. The SMI handler 137 includes a reader 315, P performance tables $320_1$ to $320_P$, a default table 330, a scanner 335, a comparator 340, a selector 345, a parser 350, and a checksum updater 375.

The reader 315 reads contents of the performance status register 107 (FIG. 1) which contain a performance information 310. The performance information 310 may include code for operating frequency such as the bus ratio, and the corresponding power such as voltage identifier (V_ID). The reader 315 presents the performance information to the comparator 340.

Each of the P performance tables $320_1$ to $320_P$ defines the supported and validated operating points for a given processor stepping and maximum frequency point. From time to time, when there is a new processor stepping or when there are several stock keeping units (SKU's) of a processor, the P performance tables $320_1$ to $320_P$ may be updated. Each entry of the P performance tables $320_1$ to $320_P$ is organized into three fields: a frequency field that stores the processor frequency in MHz, a power field that stores the power in Watts, and a control/status field that stores a performance index $322_1$ to $322_P$ that contains code for the bus ratio or a bus ratio parameter, and voltage control identifier. Typically each table contains a number of entries corresponding to multiple operating points that are validated. For each table $320_k$, the performance index of one of the entries is used as the performance index for the table $320_k$. The entry that has this table performance index corresponds to the same operating point whose performance state information is stored in the status register of the processor at reset. In one embodiment, this entry corresponds to the maximum performance mode of the processor. As is known by one skilled in the art, any other entry can be used to contain this table performance index.

The default table 330 includes two default performance states, a maximum performance state 332 and a minimum performance state 335. As is known by one skilled in the art, any number of performance states can be used and any other states can be used. The default table 330 is used when there is no performance table that matches the performance information 310 as will be explained below. The default table 330 may also be used when there are no performance tables or when the performance tables $320_1$ to $320_P$ are known to be defective or erroneous.

The scanner 335 scans or multiplexes through the P performance tables $320_1$ to $320_P$ to obtain the performance indices $322_1$ to $322_P$. The comparator 340 compares the performance information 310 with the scanned performance indices $322_1$ to $322_P$. The comparator 340 generates a MATCH signal or returns a value to determine if at least one the performance indices $322_1$ to $322_P$ matches with the performance information. If there is a match, the MATCH signal or the return value may also include the table number whose performance index matches with the performance information 310. This table will be referred to as a processor performance table. The selector 345 selects one of the tables from the P performance tables $320_1$ to $320_P$ and the default table 330 to be copied or loaded to the local table 360 in the system memory 140 or some local scratchpad registers or memory in the chipset 130 or 150 or the processor 110. Once this processor performance table is located, it is then selected to be copied to the local table 360. If there is no match, the default table 330 is selected and copied to the local table 360.

The parser 350 parses a source language code 370 in the memory 140. In one embodiment, the source language code is an ACPI source language (ASL) code. The source language code 370 contains a number of performance state (PS) structures including a _PCT structure 372, a processor supported state (_PSS structure) 374, and a _PPC structure 376. The PS structure that is relevant for this activity is the _PSS structure 374. The parser 350 scans the source language code and locate the PS structure or object. The PS structure is a data structure which contains the performance states. PS structure may include several entries, each entry corresponding to an operating point. The elements of each entry include an operating frequency (in MHz), a power (in Watts), a latency (in μsec or nsec), a bus master latency (in μsec or nsec), a control word, and a status word. As will be described later, after the PS structure is located or extracted, its entries are then replaced by the entries in the local table 360. Therefore, the PS structure is dynamically updated so that the performance states can be reported to an OS that supports ACPI (e.g., the ACPI OS 145 in FIG. 1). In addition, the performance states can be stored in platform SMI so that the information can also be reported to an applet on OS'es that do not have the native control for the performance states.

The checksum updater 375 updates the checksum for a description table 380 associated with ACPI model. In one embodiment, the description table is the Differentiated System Description Table (DSDT) defined by the ACPI version 2.0 standard.

Figure 4:
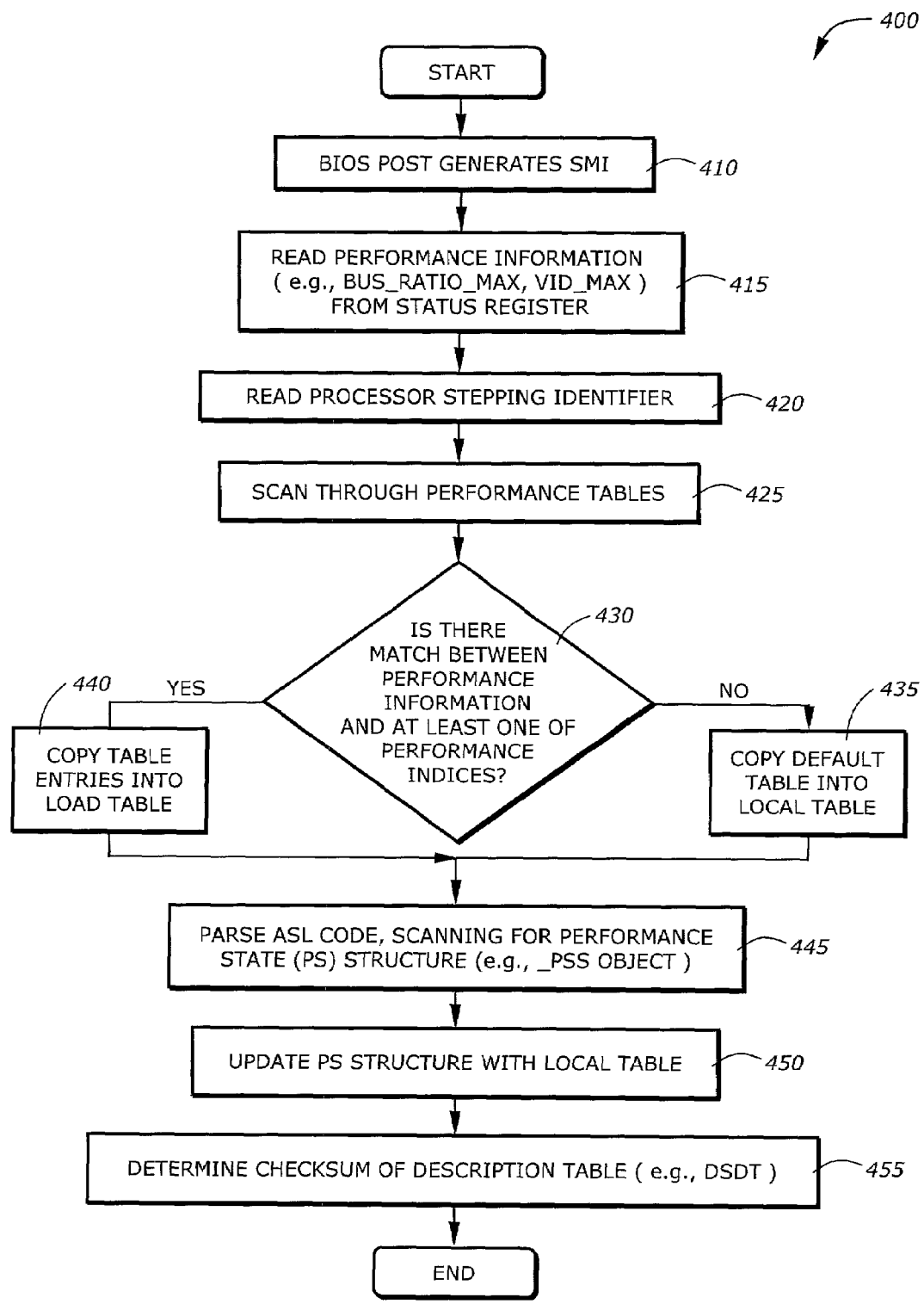
FIG. 4 is a flowchart illustrating a process to report multiple performance states according to one embodiment of the invention.

FIG. 4 is a flowchart illustrating a process 400 to report multiple performance states according to one embodiment of the invention.

Upon START, the BIOS Power-On Self Test (POST) code generates a software SMI (Block 410). A SMI handler is invoked to respond to the SMI. Then, the SMI handler reads the performance information from the performance status register in the processor (Block 415). The performance information includes the power and frequency information of the current operational point of the processor. Typically, upon power-on reset, the status register is initialized with the maximum performance state information. This maximum performance state information includes the maximum bus ratio (BUS_RATIO_MAX) and the maximum voltage identifier (VID_MAX). Then, the SMI handler reads the processor stepping identifier (Block 420). This stepping identifier is useful to locate the correct performance table. Next, the SMI handler scans through the performance tables stored in the BIOS (Block 425).

Then, the SMI handler determines if there is a match between the performance information read from the status register and any of the performance indices in the performance tables (Block 430). This is done by comparing the performance information with the performance field of each of the performance entries. If there is no match, the SMI handler copies the default table to the local table (Block 435) and proceeds to Block 445. If there is a match, the SMI handler copies the performance table, referred to as the processor performance table, that has the matching performance index to the local table (Block 440).

Next, the SMI handler parses a source language code (e.g., ASL code) to scan for the PS structure (Block 445). Then, the SMI handler updates the PS structure with the local table (Block 450). Next, the SMI handler determines the checksum of the DSDT (Block 455) and is then terminated.

The process 400 therefore performs the update of the performance states and provides means to dynamically update the PS structure so that the OS can obtain the information to perform other tasks including the task of controlling the performance, or transitioning to another performance state. It should also be noted that the technique can be extended to scenarios other than in the context of a BIOS or a SMI handler. For example, the performance tables $320_1$ to $320_P$ may be transmitted remotely via some communication interface.

Figure 5:
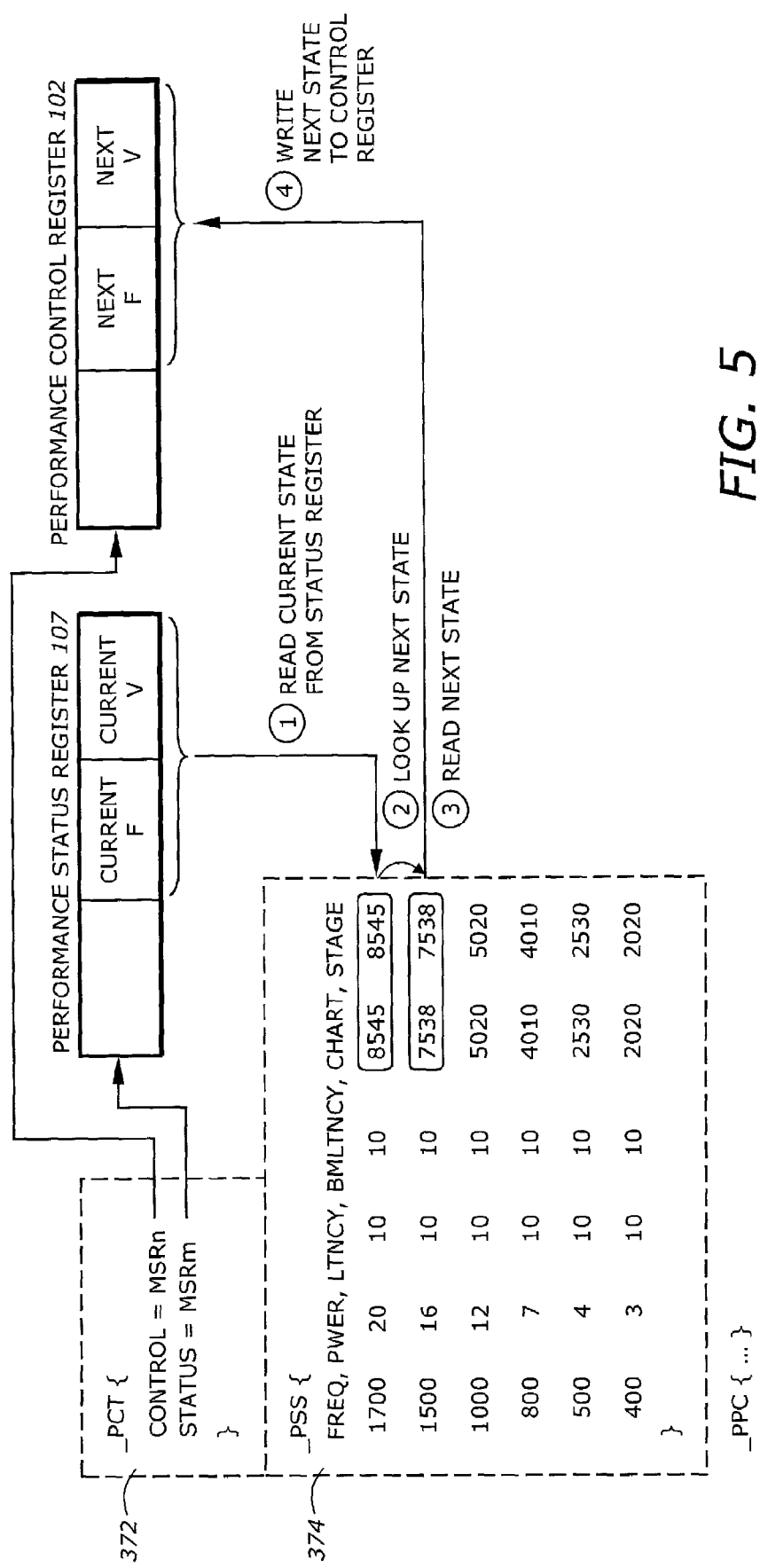
FIG. 5 is a diagram illustrating operations to transition to a next performance state according to one embodiment of the invention.

FIG. 5 is a diagram illustrating operations to transition to a next performance state according to another embodiment of the invention. The transition operations involve PS structures performance control (_PCT) 372 and performance supported states (_PSS) 374 (FIG. 3), the performance control register (PERF_CTL) 102, and the status register (PERF_STS) 107 in the processor 110 (FIG. 1).

The _PCT structure 372 contains information on the model specific register (MSR) for the PERF_CTL 102 and PERF_STS 107. For example, the MSR n points to the PERF_CTL 102 and the MSR m points to the PERF_STS 107. The _PSS structure 374 contains performance state information as discussed above. In the example shown in FIG. 5, the control and status fields of the entry in the _PSS structure 374 are used for the transitioning.

The PERF_CTL 102 has a number of fields. The two fields that are relevant are the PERF_SEL and VID_SEL. The two fields are shown as NEXT F and NEXT V, respectively in FIG. 5 to indicate that they are two control fields for the next frequency and the next voltage. The PERF_STS 107 has a number of fields. The two relevant fields are PERF_STS and VID_STS. These two fields are shown as CURRENT F and CURRENT V, respectively, in FIG. 5 to indicate that they are the current frequency and current voltage.

The performance state transition is typically performed by the OS after the PS structure is updated by the SMI handler as discussed in FIG. 3. After the PS structure is updated, the SMI handler boots the platform and loads the ACPI OS into the system memory 140 (FIG. 1). Then, the ACPI OS takes over. When it is necessary for a performance change according to some performance criteria, the OS performs the transitioning task. The criteria to perform a performance state transition may include work load, power source, thermal conditions, end-user direction, or some other policy mechanism.

To perform a performance transition, the OS may first read the current performance state from the PERF_STS 107 which includes the code for the current frequency and current voltage. Then, the OS uses this code as an index to locate a current entry having this code in the _PSS structure 374. When the current entry is located, the OS then looks up the next entry based on the current entry. The next entry may correspond to a lower or higher performance state depending on the criteria and the performance conditions at the time. The OS then reads the control and status fields of the next entry and write to the NEXT F and NEXT V fields in the PERF_CTL 102.

Figure 6:
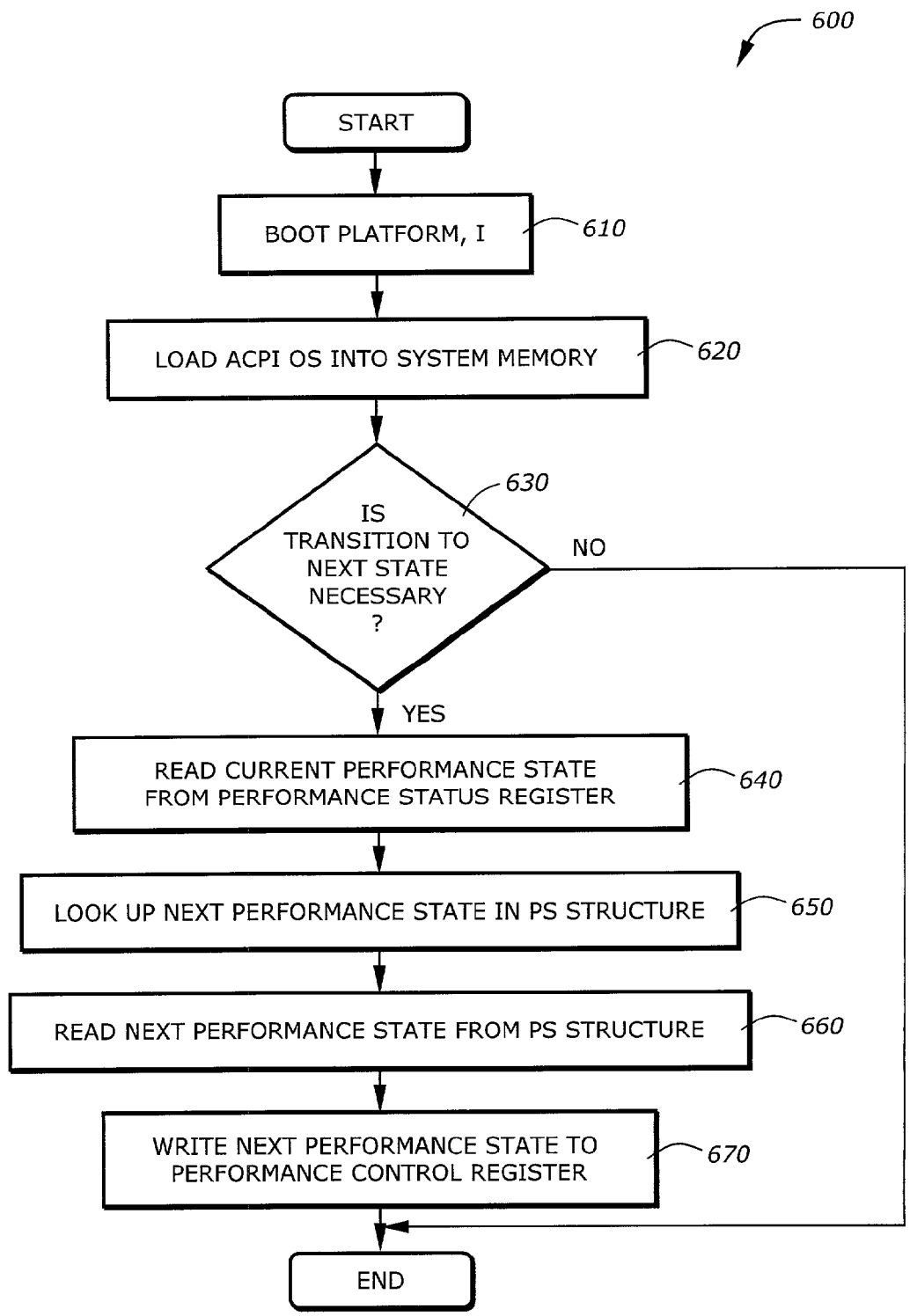
FIG. 6 is a flowchart illustrating a process to transition to a next performance state according to one embodiment of the invention.

FIG. 6 is a flowchart illustrating a process 600 to transition to a next performance state according to another embodiment of the invention. The process 600 essentially performs the tasks as shown in FIG. 5.

Upon START, the SMI handler boots the platform containing the processor (Block 610). Typically, this is done after the PS structure is updated as discussed in FIGS. 3 and 4. Then, the SMI handler loads the ACPI OS into the system memory (Block 620). Next, the ACPI OS determines if the transition to the next performance state is necessary (Block 630). This is done by evaluating the criteria as discussed above. If no transitioning is necessary, the process 600 is terminated. Otherwise, the OS performs the transitioning task.

The OS reads the current performance state from the performance status register (Block 640). Then, the OS evaluates the PS structure and looks up the next performance state in the PS structure using the current performance state as a pointer (Block 650). This can be done by comparing the current performance state with the control and status fields of the entries in the PS structure. Next, the OS reads the next performance state from the PS structure (Block 660). Then, the OS writes the next performance state to the performance control register (Block 670) and is then terminated.

Figure 7:
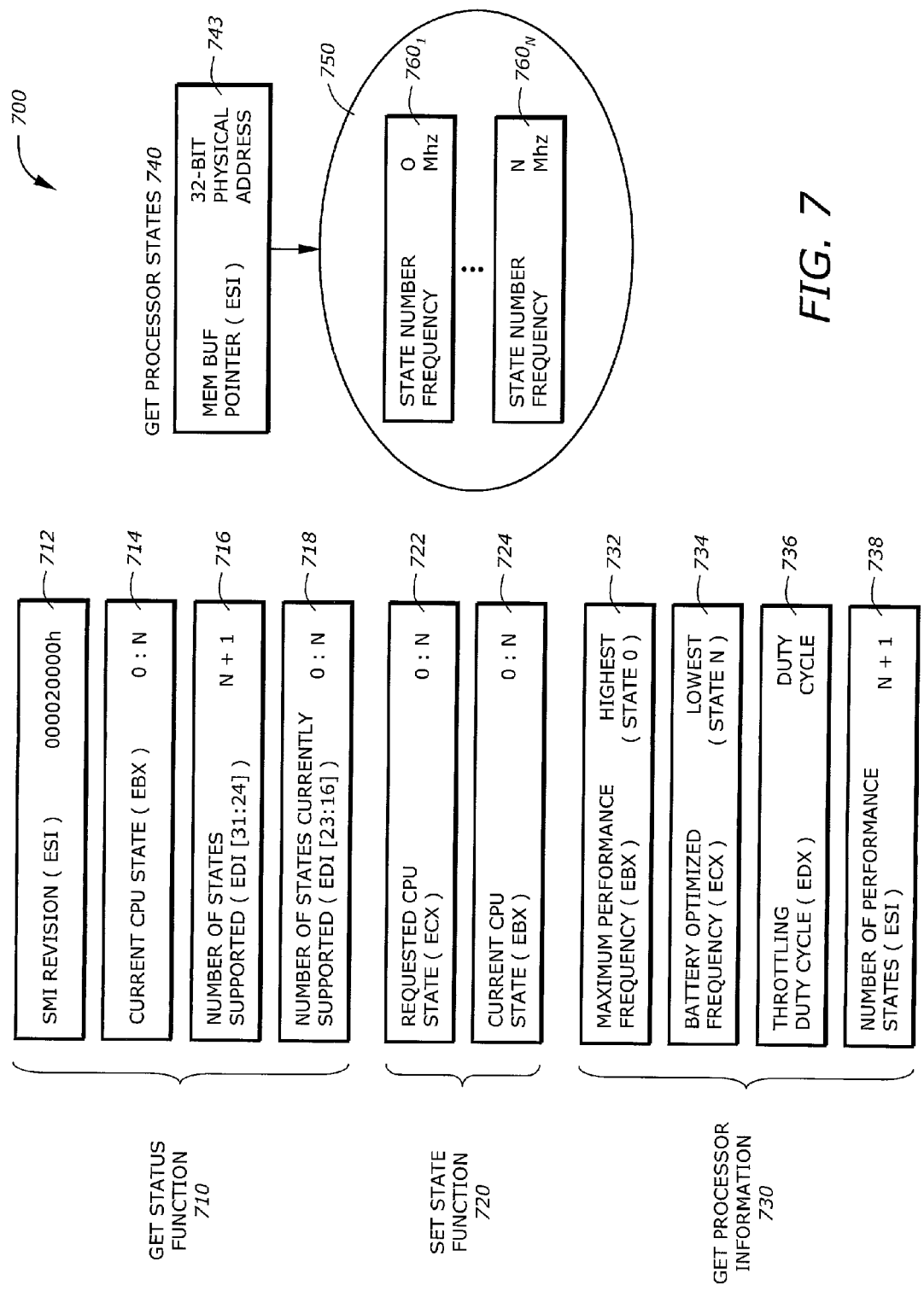
FIG. 7 is a diagram illustrating an applet SMI interface according to one embodiment of the invention.

FIG. 7 is a diagram illustrating an applet SMI interface 700 according to another embodiment of the invention. The applet SMI interface 700 is used to support the multiple performance states on older OS's that do not include the native processor performance state control. The applet SMI interface 700 is also used to replace the old applet SMI interface which supports only two operating points such as the two end points of the curve L as shown in FIG. 2. The applet SMI interface 700 includes a get status function 710, a get state function 720, a get processor information 730, and a get processor states 740.

The get status function 710 includes a SMI revision 712, a current CPU state 714, a number of states supported 716, and a number of states currently supported 718. The SMI revision 712 shows the revision number in the ESI register. The current CPU state 714 shows the supported from state 0 to state N stored in EBX register, where N is a predefined positive integer. The number of states supported 716 is N+1 stored in bits 31:24 of the EDI register. The number of states currently supported 718 is state 0 to state N stored in bits 23:16 of the EDI register.

The set state function 720 includes a requested CPU state 722 and a current CPU state 724. The requested CPU state 722 is state 0 to state N and is stored in ECX register. The current CPU state 724 is state 0 to state N and is stored in EBX register.

The get processor information 730 includes a maximum performance frequency 732, a battery optimized frequency 734, a throttling duty cycle 736, and a number of performance states 738. The maximum performance frequency 732 shows the highest frequency in EBX register which typically corresponds to state 0. The battery optimized frequency 734 shows the lowest operating frequency in ECX register which typically corresponds to state N. The throttling duty cycle 736 shows the duty cycle in EDX register. The number of performance states 738 shows N+1 in ESI register.

The get processor states 740 includes a memory buffer pointer 742 which contains a 32-bit physical address in ESI register to point to a memory buffer 750. The memory buffer 750 includes N+1 state number frequencies $760_1$ to $760_{N+1}$, each showing the frequency in MHz.

FIG. 8 is a state diagram illustrating a utilization switching policy 800 according to another embodiment of the invention. The switching policy 800 illustrates a three-state implementation for state switching.

The switching policy 800 implements a flexible and tunable procedure to support multiple performance states. The following pseudo code describes the procedure for switching performance states:

---
If (Utilization > UpThreshold) for (Uptime), then
   transition to next higher performance state;
if (utilization < DownThreshold) for (DownTime), then
   transition to next lower performance state
else remain at current state.

---

Since the parameters UpThreshold, Up time, DownThreshold, and DownTime are all programmable and variable, the switching policy can be configured to optimize for maximum performance by employing a fast up, slow down procedure, or configured to optimize for longer battery life by employing a slow up, fast down procedure.

The state diagram 800 has three states: state 0, state 1, and state 2. State 0 corresponds to the highest performance and state 2 corresponds to the lowest performance. State 1 corresponds to a medium performance. In any of the states, if the utilization is within the L (DownThreshold) and the H (UpThreshold), then the processor remains in the same state. At state 0, if utilization is below L, the processor transitions to state 1. At state 1, if utilization is above H, the processor transitions to state 0. If utilization is below L, the processor transitions to state 2. At state 2, if utilization is above H, the processor transitions to state 1.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:

reading a performance information associated with a processor;

attempting to locate a processor performance table that corresponds to the performance information, the processor performance table including a plurality of performance parameters to control performance of the processor, wherein attempting to locate comprises
   scanning through a set of processor performance tables;
   comparing the performance information with performance indices in the processor performance tables, and
   if at least one of the performance indices matches with the performance information, copying entries of the processor performance table corresponding to the at least one of the performance indices to a local table, else copying a default table to the local table; and updating a performance state (PS) structure using information copied to the local table.

2. The method of claim 1 wherein reading the performance information comprises:

reading one of a maximum performance parameter and a minimum performance parameter from a register in the processor.

3. The method of claim 1 wherein updating the PS structure comprises:

parsing a source language code containing the PS structure; and replacing entries in the PS structure by the local table.

4. The method of claim 1 further comprising:

updating a checksum for a description table according to an advanced configuration and power management (ACPI) protocol.

5. The method of claim 1 wherein reading the performance information comprises:

reading a bus ratio parameter and a voltage identifier, the bus ratio parameter corresponding to an operating frequency, the voltage identifier corresponding to an operating power of the processor.

6. A method comprising:

booting a platform having a processor after a performance state (PS) structure is updated with one of a processor performance table and a default table, the processor performance table being located based on processor information and including a plurality of performance parameters to control performance of the processor; and updating a performance state (PS) structure using one of the processor performance table and a default table;

loading an advanced configuration and power management (ACPI) operating system (OS); and transitioning to a next performance state based on a performance criteria using the PS structure.

7. The method of claim 6 further comprises:

evaluating the PS structure.

8. The method of claim 6 wherein transitioning comprises:

reading a current performance information from a status register in a processor;

comparing the current performance information with the PS structure to locate a current entry in the PS structure; and obtaining a next entry based on the current entry.

9. The method of claim 8 wherein transitioning further comprising:

updating a control register associated with performance of the processor using the next entry.

10. A computer program product comprises:
a machine useable medium having computer program code embedded therein, the computer program product having:
computer readable program code to read a performance information associated with a processor;
computer readable program code to attempt to locate a processor performance table that corresponds to the performance information, the processor performance table including a plurality of performance parameters to control performance of the processor, wherein the computer readable program code to locate the processor performance table comprises,
computer readable program code to scan through a set of processor performance tables;
computer readable program code to compare the performance information with performance indices in the processor performance tables;
computer readable program code to copy entries of the processor performance table corresponding to at least one of the performance indices to a local table if the at least one of the performance indices matches with the performance information, and
computer readable program code to copy a default table to the local table if none of the performance indices matches with the performance information; and
computer readable program code to update a performance state (PS) structure using information copied to the local table.

11. The computer program product of claim 10 wherein the computer readable program code to read the performance information comprises:
computer readable program code to read one of a maximum performance parameter and a minimum performance parameter from a register in the processor.

12. The computer program product of claim 10 wherein the computer readable program code to update the PS structure comprises:
computer readable program code to parse a source language code containing the PS structure; and
computer readable program code to replace entries in the PS structure by the local table.

13. The computer program product of claim 10 further comprising:
computer readable program code to update a checksum for a description table according to an advanced configuration and power management (ACPI) protocol.

14. The computer program product of claim 10 wherein the computer readable program code to read the performance information comprises:
computer readable program code to read a bus ratio parameter and a voltage identifier, the bus ratio parameter corresponding to an operating frequency, the voltage identifier corresponding to an operating power of the processor.

15. A computer program product comprising:
a machine useable medium having computer program code embedded therein, the computer program product having:
computer readable program code to boot a platform having a processor after a performance state (PS) structure is updated with one of a processor performance table and a default table, the processor performance table being located based on processor information and including a plurality of performance parameters to control performance of the processor;
computer readable program code to load an advanced configuration and power management (ACPI) operating system (OS); and
computer readable program code to transition to a next performance state based on a performance criteria using the PS structure.

16. The computer program product of claim 15 further comprises:
computer readable program code to evaluate the PS structure.

17. The computer program product of claim 15 wherein the computer readable program code to transition comprises:
computer readable program code to read a current performance Information from a status register in a processor;
computer readable program code to compare the current performance information with the PS structure to locate a current entry in the PS structure; and
computer readable program code to obtain a next entry based on the current entry.

18. The computer program product of claim 17 wherein the computer readable program code to transition further comprising:
computer readable program code to update a control register associated with performance of the processor using the next entry.

19. A system comprising:
a processor;
a memory coupled to the processor to store a system management interrupt (SMI) handler, the SMI handler when executed in response to an SMI, causing the processor to:
read a performance information associated with a processor,
attempt to locate a processor performance table that corresponds to the performance information, the processor performance table including a plurality of performance parameters to control performance of the processor,
wherein the SMI handler causing the processor to locate the processor performance table causes the processor to scan through a set of processor performance tables;
compare the performance information with performance indices in the processor performance tables, and
if at least one of the performance indices matches with the performance information, copy entries of the processor performance table corresponding to the at least one of the performance indices to a local table, else copy a default table to the local table; and
update a performance state (PS) structure using information copied to the local table.

20. The system of claim 19 wherein the SMI handler causing the processor to read the performance information causes the processor to:
read one of a maximum performance parameter and a minimum performance parameter from a register in the processor.

21. The system of claim 19 wherein the SMI handler causing the processor to update the PS structure causes the processor to:
parse a source language code containing the PS structure; and
replace entries in the PS structure by the local table.

22. The system of claim 19 the SMI handler further causes the processor to:
update a checksum for a description table according to an advanced configuration and power management (ACPI) protocol.

23. The system of claim 19 wherein the SMI handler causing the processor to read the performance information causes the processor to:
read a bus ratio parameter and a voltage identifier, the bus ratio parameter corresponding to an operating frequency, the voltage identifier corresponding to an operating power of the processor.

24. A system comprising:
a processor in a platform;
a system memory coupled to the processor; and
a basic input output system (BIOS) memory coupled to the processor, the BIOS memory storing a system management interrupt (SMI) handler, the SMI handler, when executed in response to an SMI, causing the processor to:
boot the platform after a performance state (PS) structure is updated with one of a processor performance table and a default table, the processor performance table being located based on processor information and including a plurality of performance parameters to control performance of the processor, and
load an advanced configuration and power management (ACPI) operating system (OS) into the system memory, the ACPI OS, when executed, causing the processor to transition to a next performance state based on a performance criteria using the PS structure.

25. The system of claim 24 wherein the ACPI OS, when executed, further causes the processor to:
evaluate the PS structure.

26. The system of claim 24 wherein the ACPI OS causing the processor to transition causes the processor to:
read a current performance information from a status register in the processor;
compare the current performance information with the PS structure to locate a current entry in the PS structure; and
obtain a next entry based on the current entry.

27. The system of claim 26 wherein the ACPI OS causing the processor to transition further causes the processor to:
update a control register associated with performance of the processor using the next entry.

* * * * *